United States Patent [19]
Sirat et al.

[11] Patent Number: 4,602,844
[45] Date of Patent: Jul. 29, 1986

[54] MONOCHROMATIC INCOHERENT LIGHT HOLOGRAPHY

[75] Inventors: Gabriel Sirat, Pasadena; Demetri Psaltis, Altadena, both of Calif.

[73] Assignee: California Institute of Technology, Pasadena, Calif.

[21] Appl. No.: 655,748

[22] Filed: Oct. 1, 1984

[51] Int. Cl.⁴ ................................................. G03H 1/06
[52] U.S. Cl. .................................................... 350/3.83
[58] Field of Search ............. 350/3.6, 3.77, 3.83–3.86, 350/401

[56] References Cited

PUBLICATIONS

Bryngdahl, et al., "One-Dimensional Holography with Spatially Incoherent Light" Journal of the Optical Society of America, vol. 58, No. 5, May, 1968, pp. 625–627.
Lohmann, A. W., "Wavefront Reconstruction for Incoherent Objects," Journal of the Optical Society of America, vol. 55, pp. 1555–1556, Nov. 1965.
Worthington, H. R., "Production of Holograms with Incoherent Illumination," Letters to the Editor, Journal of the Optical Society of America, vol. 56, No. 10, pp. 1397–1398, Oct. 1966.

Primary Examiner—Bruce Y. Arnold
Attorney, Agent, or Firm—Freilich, Hornbaker, Rosen & Fernandez

[57] ABSTRACT

A hologram is recorded on a recording medium with polarized, monochromatic and incoherent light by passing the light from image points through an anisotropic medium and a polarization analyzer. A difference in phase retardation occurs for each of orthogonally polarized ordinary and extraordinary light waves which set up a transfer function of diffraction pattern at the film for recordation. The image can be reconstructed with monochromatic light passed back through the recording system, or with coherent light by illuminating the film directly to form the image on the opposite side at a position in space corresponding to the original point of the image recorded.

12 Claims, 7 Drawing Figures

MONOCHROMATIC INCOHERENT LIGHT HOLOGRAPHY

BACKGROUND OF THE INVENTION

This invention relates to a method and apparatus for recording and reconstructing holograms using incoherent light.

It was recognized early on that holograms, which are normally implemented utilizing coherent light, can also be formed with incoherent or partially coherent light. In ordinary holography each object point, i.e., the intensity at lateral and longitudinal locations, is interferometrically recorded as a Fresnel Zone Plate (FZP) using photographic medium. In any system, including incoherent coded aperture imaging systems, in which each object point is coded as a FZP, the image can be reconstructed by optical diffraction and can be viewed as an hologram.

Several schemes have been proposed for incoherent recording, such as interferometric systems including an amplitude splitting interferometer, based on a double-focus birefringent lens. See G. Cochran, J. Opt. Soc. Am. 56 1513 (1966), H. R. Worthington, J. Opt. Soc. Am. 56 1397 (1966), G. W. Stroke and R. C. Restrick III, App. Phy. Lett. 7, 229 (1965), and A. W. Lohmann, J. Opt. Soc. Am 55, 1555 (1965).

All such incoherent holographic schemes are relatively cumbersome, or require complicated mechanical or electrical apparatus. The low signal-to-bias ratio that is inherent in incoherent holography, is also a severe limitation. See Collier, et al., "Optical holography," Chap. 20 Academic Press, (1971). The present invention permits the recording and reconstruction of holograms with incoherent light, utilizing the properties of optical propagation in birefringent crystals wherein two interfering light beams have identical geometrical paths.

SUMMARY OF THE INVENTION

In accordance with the present invention, an image point of polarized, monochromatic and incoherent light is transmitted to a recording medium through an anisotropic medium, such as a biaxial or uniaxial birefringent crystal, with the light so polarized as to provide two orthogonally polarized waves in order that that a difference in phase retardation occurs in the two waves due to a different index of refraction for each of the orthogonally polarized light waves. The difference in phase is translated to amplitude change by a polarization analyzer, and recorded in a suitable medium. This sets up a transfer function, such as a Fresnel zone, for each image point of the object equivalent to a diffraction pattern. The light intensity recorded for each image point is thus a transfer function of a diffraction pattern. Reconstruction of the image thus recorded can be accomplished by illuminating the recording medium from the rear with incoherent light and passing the light back through the system as used for recording, with the recording medium in the same plane relative to the anisotropic medium used while recording. Alternatively, the image can be reconstructed with coherent light. Due to the focusing property of the transfer function of diffraction pattern, an image point is formed on the opposite side at a position in space corresponding to the original point of the image recorded. The reconstruction can be accomplished by other techniques, such as scanning the recorded image with a vidicon and processing the data in a programmed computer.

The novel features of the invention are set forth with particularity in the appended claims. The invention will best be understood from the following description when read in conjunction with the drawings.

DESCRIPTION OF PREFERRED EMBODIMENTS

Briefly the present invention for monochromatic incoherent holographic recording is based on orthogonally polarized light propagation in anisotropic media, such as birefringent uniaxial crystal 10 as an example. It is evident that a biaxial crystal may also be used in the same way with only a slight difference in the shape of the interference rings. It is also evident that an optical active crystal utilizing linearly polarized light instead of circularly polarized light will behave in the same way.

In the case of a uniaxial crystal, the rings will be circular, whereas for biaxial crystals, they will be elliptical. Light propagation in uniaxial crystals is a phenomenon closely related to interference. See Ditchburn, Light Chap XVI, Interscience Wiley (1963).

An analyzer produces the interference between the ordinary and the extraordinary beams of a previously polarized light beam. The angular dependence of the extraordinary index of refraction causes an angle dependent change in optical path. This effect is responsible for the formation of the familiar conoscopic figures shown by Born and Wolfe, *Principles of Optics*, Chap. XIV, Pergamon (1975). This same effect is used in the present invention as a basis for monochromatic incoherent holography, in place of geometrical interference.

The most advantageous feature of the invention is the fact that the two interfering light beams have the same source and identical geometrical paths. Furthermore, the natural space invariance of the system permits the equalization of the optical paths of the two beams over the full image frame and as a consequence the spatial coherence of the source imposes no limitations on the sizes of the object and the hologram. The availability of the entire crystal optics framework, a well known and developed area for conoscopes, can make this method practical.

INCOHERENT RECORDING

Figure 1:
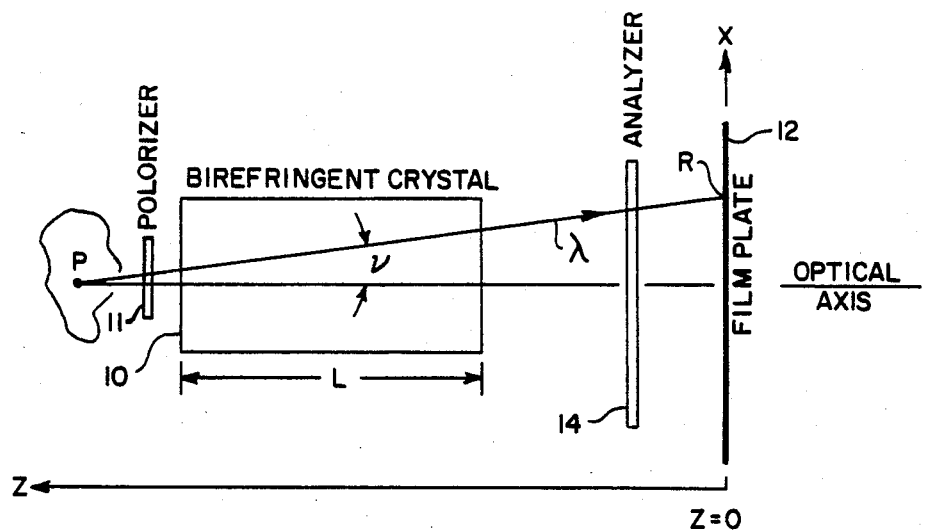
FIG. 1 illustrates schematically the method and apparatus for recording holograms using circularly polarized incoherent light in accordance with the present invention.
Figure 2:
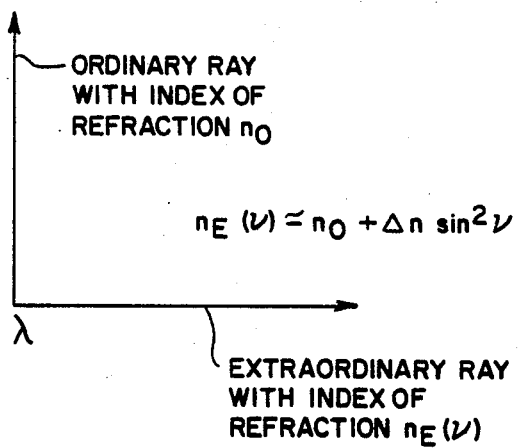
FIG. 2 is a diagram of the light of wavelength λ propagating through the birefringent crystal of FIG. 1 with different indices of refraction for the orthogonally polarized waves.

The optical arrangement that is used for recording in accordance with one example of this invention is shown in FIG. 1. Circularly polarized monochromatic light from an image with wavelength $\lambda$ is divided into two orthogonally polarized light beams (ordinary and extraordinary) by a polarizer 11. The two beams propagate through the birefringent crystal 10 at an angle $\nu$ relative to the optical axis. If the ordinary and the extraordinary indeces of refraction are $n_O$ and $n_E$, respectively, as shown in FIG. 2, and their difference is $\Delta n = n_E - n_O$, then two orthogonally polarized waves will propagate, one the ordinary wave with an index of refraction $n_O$, and the other the extraordinary wave with an index of refraction $n_E(\nu)$ given approximately by:

$$n_E(\nu) \approx n_O + \Delta n \sin^2 \nu \qquad (1)$$

The phase retardation between the extraordinary and the ordinary waves is given by:

$$\Delta \alpha = (2\pi/\lambda)(L/\cos \nu)\Delta n \sin^2 \nu \approx (2\pi L/\lambda)\Delta n \nu^2, \quad \nu << 1. \qquad (2)$$

Let a circularly polarized image object point P located at object coordinates (X, Y, Z) radiate light intensity I(P) in a cone of half-angle $\nu_o$. The origin of the z-axis is taken at the film plate. For simplicity, the convention that the light outside the crystal propagates in a medium of refractive index $n_O$ is used and the distances are scaled accordingly.

The light intensity detected at the film plate 10, through an analyzer 14, at a point R, with coordinates (x', y', 0), due to the light originating from point P is given by:

$$I(R,P) = I(P) \cos^2(0.5\Delta\alpha(P,R)) = 0.5I(P) + 0.5I(P)\cos(\Delta\alpha(P,R)) \qquad (3)$$

The total intensity I(R) at point R is given by:

$$I(R) = \int_V I(R,P)dP = \int_V I(P)T(R,P)dP, \qquad (4)$$

where V contains all the points P in the object volume from which light can reach R, and T(R,P) is the impulse response of the system. Using Eq. (2) and the paraxial approximation for $\nu^2$, i.e., the approximation of the square of the angle $\nu$ relating to the immediate neighborhood of the optical axis:

$$\nu^2 \approx [(x-x')^2 + (y-y')^2]/z^2, \qquad (5)$$

we obtain $$I(R,P) = I(P)T(P,R) = I(P)\{0.5 + 0.5 \cos[2\pi L\Delta n((x-x')^2 + (y-y')^2)/z^2\lambda]\} \qquad (6)$$

The above is a FZP, centered at $x'=x$, $y'=y$, plus a constant bias.

If we view the FZP formation as interference between the ordinary and extraordinary waves, the image and reference beams have identical geometrical paths, but different optical pathlengths, due to the angle dependence of the refractive index of the extraordinary wave. Thus, using incoherent light passing through an anisotropic medium, a hologram of the extraordinary wave is recorded using the ordinary wave as a reference beam.

The number of fringes, F, in the FZP is equal to:

$$F = L\Delta n \sin^2 \nu_o/\lambda \approx (L\Delta nA^2)/\lambda z_o^2, \qquad (7)$$

where A is the radius of the FZP and $z_o$ is the mean distance from the object to the film. We now rewrite Eq. (6) as:

$$I(R,P) = I(P)[0.5 + 0.5 \cos\{2\pi[(x-x')^2 + (y-y')^2]/\lambda_{EQ}z\}], \qquad (8)$$

$$\lambda_{EQ} = \lambda z/\Delta nL \approx A^2/Fz_o. \qquad (9)$$

Figure 3A:
FIGS. 3a, 3b and 3c are records of Fresnel zones at film plates for one, two and three image points, respectively.
Figure 3B:
Figure 3C:

For $z=L$, $\lambda_{EQ}$ is the wavelength in a medium having an index of refraction $\Delta n$. The dependence of the equivalent wavelength on the distance is due to the fact that the anisotropic medium, the birefringent crystal 10, is finite in the z-direction. FIGS. 3a, 3b and 3c illustrate a separate FZP for each of one, two and three image points, respectively.

CONOSCOPIC RECONSTRUCTION

Figure 4:
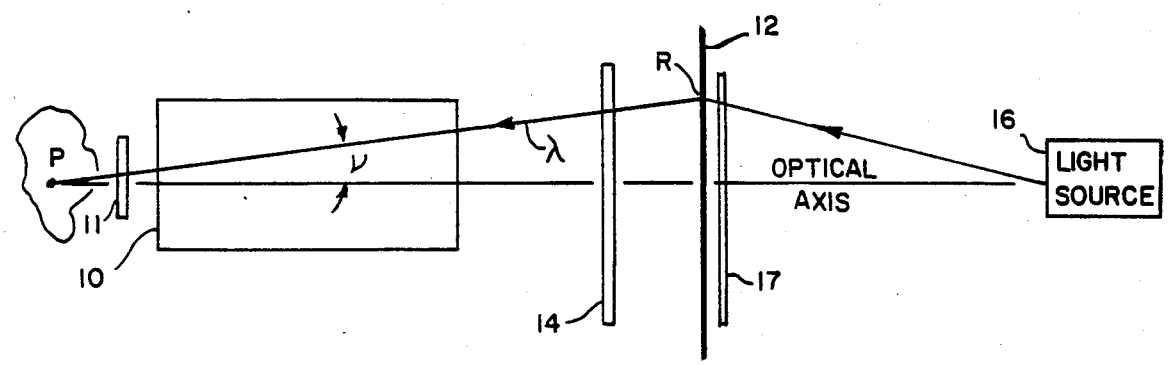
FIG. 4 illustrates schematically one method and apparatus for reconstructing holograms using incoherent light passing back through the recorded hologram and system of FIG. 1.

One method for optically reconstructing a hologram recorded as just described is by placing it at the plane $z=0$ in the system of FIG. 1, illuminating it from the right with a source 16 of coherent or incoherent light through a diffuser 17, and passing the diffused light back through the system as shown in FIG. 4. The light intensity at a point p'' at the left side of the crystal viewed through an analyzer is:

$$I(P'') = \int_{S'} I(R)T(P',R)dS'. \qquad (10)$$

The surface S' includes all the points R on the film from which light rays can reach the point P'', or reversing the optical system, this is the surface reached by light from P, when the hologram is constructed. Using Eq. (4):

$$I(P'') = \int_{S'} \int_V I(P)T(P,R)T(P',R)dVdS'. \qquad (11)$$

From the orthogonality of Fresnel functions for infinite S and S', the intensity $I(P'') = I(P)$ and the original image is reconstructed. The finite extent of S' will determine the resolution. The lateral resolution of a FZP is equal to the diffraction limit of a lens with the same aperture. The lateral resolution is:

$$\Delta X = (1.22\lambda_{EQ}z_o)/2A = 1.22\lambda z_o^2/\Delta nAL = (1.22A^2 z_o)/2AFz_o = 0.61A/F. \qquad (12)$$

In order to calculate the longitudinal resolution, approximate the FZP of Eq. (6) setting $z = z_o + \Delta z$ and $\Delta z << z_o$ $$\begin{aligned}I(R,P) &= .5I(P)\cos[2\pi\Delta nL((x-x')^2 + (y-y')^2)/\lambda(z_o + \Delta z)^2] \\ &\approx .5I(P)\cos[2\pi\Delta nL((x-x')^2 + (y-y')^2)/\lambda(z_o + 2\Delta z)] \\ &\approx .5I(P)\cos[2\pi\Delta nL((x-x')^2 + (y-y')^2)/\lambda Z],\end{aligned} \qquad (13)$$

where $Z = z_o + 2\Delta z$. The longitudinal resolution will be twice the resolution of a coherent FZP or $$\Delta z = 0.5\Delta x(z_o/A) = 0.61(z_o/2F). \qquad (14)$$

The required film resolution $I_1$ is the same as for a point-reference Fourier process and will be given by:

$$I_1 = 2(0.61/\Delta x) = (2F/A), \quad (15)$$

where a factor of 2 may be needed due to the stronger z-dependence.

If we define m the ratio of the size of the film, G, to the FZP size, A, the space bandwidth product will be:

$$SBP = 1.64 I_1 G = 1.64(2F/A) mA = 3.38 mF. \quad (16)$$

The wavelength resolution (the needed monochromaticity) will be:

$$\Delta\lambda/\lambda = (1/F). \quad (17)$$

It is well known that the same analysis can be carried out for linearly polarized light that is oriented at an angle of 45° with respect to the crystal axis so as to produce orthogonally polarized ordinary and extraordinary light waves through the crystal, thus ending up with a diffraction pattern on which a cross is superposed. In that way, linearly polarized light may be used, but with a loss of efficiency.

COHERENT RECONSTRUCTION

Figure 5:
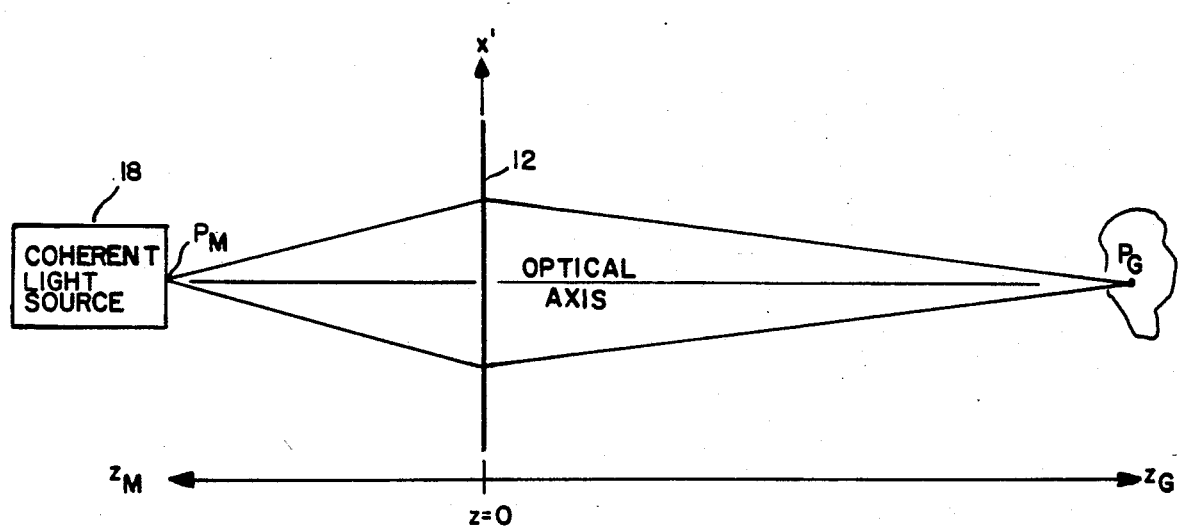
FIG. 5 illustrates schematically an alternative method for reconstructing holograms using coherent light passing back through the recorded hologram.

Another method for reconstructing this conoscopic hologram is based on diffraction. The hologram is recorded on a photographic film as described with reference to FIG. 1 and illuminated by a coherent source 18 as shown in FIG. 5. The amplitude of the illumination field at plane $z=0$ is given by:

$$a_R = \exp(j\alpha_R) = \exp[j(2\pi/\lambda)(x'^2 + y'^2)/2z_M]. \quad (18)$$

We define $\mu$, the wavelength ratio at $z = z_o$, as:

$$\mu = \lambda_E Q(z_0)/\lambda. \quad (19)$$

For a hologram of a single point, the optical wavefront $A_G$ immediately following the FZP of Eq. (8) at the record plane $z=0$ is:

$$A_G(R) = \exp(j\alpha r) \int_S I(P) T(P,R)/dS = \int_S I(P)\exp(j\alpha) dS + \text{bias}. \quad (20)$$

where $\alpha$ is given by:

$$\alpha = (2\pi/\lambda)\{[(x'-x)^2 + (y'-y)^2]z_0/Z^2\mu + (x'^2+y'^2)/2z_M\} = (x'^2+y'^2)/2z_G + (x'x_G + y'y_G)/z_G + \text{phase term} \quad (21)$$

Due to the focusing property of a zone plate, an image point, $P_G$, is formed at coordinates $(x_G, y_G, z_G)$, given by:

$$(2z_G)^{-1} = (\mu z^2/z_0)^{-1} + (2z_M)^{-1} \; x_G = x(z_G z_0 \mu z^2); \\ y_G = y(z_G z_0/\mu z^2). \quad (22)$$

Although the image is reconstructed (each object point is focused), the z-dependence of the image-point coordinates will generally introduce distortions, similar to that obtained when acoustic or microwave holograms are optically reconstructed. For a relatively small depth of field, the distortion is negligible. Setting $z_M = \mu z_0 2$, we obtain:

$$(2z_G)^{-1} = (\mu z^2/z_0)^{-1} + (\mu z_0)^{-1} = \frac{1}{\mu}\left(\frac{z_0}{z^2} + \frac{1}{z_0}\right). \quad (23)$$

$$z_G = \mu z/4; \; x_G = \mu x/4; \; y_G = \mu y/4 \quad (24)$$

For $\Delta z = 0.1 z_0$, the longitudinal and lateral distortions will be 5% and 10% respectively.

The hologram can be scaled before coherent processing to obtain a more convenient size of reconstructed images.

A basic distinction of the foregoing over conventional holography is the fact that the signal and reference beams have the same geometrical paths, but different optical pathlengths. The optical path length in a homogeneous medium is defined as the product of the index of refraction, n, and the geometrical length L. All other holographic systems detect changes in L, whereas this system is based on detection of changes in n. An extra flexibility is provided by the relative angle between the optical axis of the crystal and the direction of the optical axis of the system, permitting different functional dependences other than two-dimensional Fresnel transform, such as one dimensional Fresnel transform, Fresnel transform on a carrier, or Fourier transform (hereinafter sometimes referred to collectively as "transforms"). The only constraint is that the reference and signal optical paths must be equal along the direction of optical axis of the system, providing several different useful two or more crystal configurations.

Materials with high anisotropy suitable for such a system are, for example, calcite ($CaCO_3$), rutile ($TiO_2$) or paratellurite ($TeO_2$). Calcite is a well known optical material available in large sizes. It is simple to cleave, cut and polish. The indeces of refraction are $n_o = 1.658$, $n_E = 1.486$, $\Delta n = -0.172$, $\Delta n/n = 10\%$. In a calcite crystal of x-y-z dimensions $30 \times 40 \times 25$ mm for $v_o$(in calcite) of 0.1 rad, we will have the number of fringes $F=61$ for sodium light (0.58 $\mu$m). For $z_0 = 30$ mm, the FZP radius A is 3 mm, and the lateral object resolution will be 30 $\mu$m (33 lines per mm), and the longitudinal object resolution will be 150 $\mu$m (7 lines per mm), and the film resolution 80 lines per mm. For a film of $24 \times 24$ mm, the ratio m of the film dimension to the FZP dimension is 8 and the resolution of the image is $800 \times 800 \times 40$ pixels (for the limitation abs$(z-z_0) < 0.1\,z_0$). The monochromaticity $\Delta\lambda$ will be 10 nm.

The light intensity available at the recording plane will be:

(1) 45 mW for a small sodium bulb-25W, with 80% of the light in the sodium doublet (if the object subtends an angle equal to 1 steradian from the source). If the optical system has a numerical aperture of 0.16, then for an ideal diffusing object, the intensity available at the film is 50 $\mu$W/cm$^2$, and (2) 15 mWnm/cm$^2$ for the sun, in a bright day. Therefore under the same conditions, the intensity in the recording plane will be 100 $\mu$W/cm$^2$.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. A method for recording on a medium a hologram using monochromatic, incoherent, polarized light comprised of transmitting to said recording medium each of a plurality of image points of an object in the form of orthogonally polarized ordinary and extraordinary waves through an anisotropic medium and a polarization analyzer in sequence, whereby a difference in phase retardation occurs due to different indexes of refraction for each of said orthogonally polarized ordinary and extraordinary light waves, and said ordinary and extraordinary light waves set up a transfer function of diffraction pattern at said medium for recordation.

2. A method as defined in claim 1, and including optically reconstructing a hologram recorded in said medium by illuminating a side of said recording medium, opposite the side illuminated for recording, with monochromatic light through a diffuser and passing said illuminating light transmitted through said medium back through said polarization analyzer and anisotropic medium used for recording the hologram.

3. A method as defined in claim 1, and including optically reconstructing a hologram recorded in said recording medium by illuminating said recording medium with coherent light, thereby forming said plurality of image points at a position in space corresponding to the original image points, but on the side of said recording medium opposite the side occupied by said object.

4. Apparatus for recording on a medium a hologram utilizing incoherent monochromatic light, orthogonally polarized as ordinary and extraordinary waves, from a plurality of image points, comprising an anisotropic medium and a polarization analyzer positioned on the same optical axis between said incoherent image light source and said medium, whereby a difference in phase retardation occurs in light from image points due to different indexes of refraction for each of orthogonally polarized ordinary and extraordinary light waves, and said ordinary and extraordinary light waves set up a transfer function of diffraction pattern at said film for recordation.

5. Apparatus as defined in claim 4, and including means for optically reconstructing a hologram recorded in said medium comprised of means for illuminating said film with monochromatic light from the rear and passing said illuminating light back through said recording apparatus.

6. Apparatus as defined in claim 4, and including means for optically reconstructing a hologram recorded in said film comprised of means for directly illuminating said film with a coherent light, thereby forming said plurality of image points on the opposite side at a position in space corresponding to the original image points.

7. Apparatus as defined in claim 4 wherein said anisotropic medium is comprised of a uniaxial birefringent crystal.

8. Apparatus as defined in claim 4 wherein said anisotropic medium is comprised of a biaxial birefringent crystal.

9. Apparatus as defined in claim 4 wherein said anisotropic medium is comprised of an optical active crystal.

10. Apparatus as defined in claim 4 wherein said anisotropic medium is comprised of calcite.

11. Apparatus as defined in claim 4 wherein said anisotropic medium is comprised of rutile.

12. Apparatus as defined in claim 4 wherein said anisotropic medium is comprised of paratellurite.

* * * * *